(12) United States Patent
Endara et al.

(10) Patent No.: US 12,484,935 B1
(45) Date of Patent: Dec. 2, 2025

(54) FIXATOR ROD COUPLER ASSEMBLY

(71) Applicants: Christopher D. Endara, Palmetto Bay, FL (US); Matthew J. Endara, Palmetto Bay, FL (US)

(72) Inventors: Christopher D. Endara, Palmetto Bay, FL (US); Matthew J. Endara, Palmetto Bay, FL (US)

( * ) Notice: Subject to any disclaimer, the term of this patent is extended or adjusted under 35 U.S.C. 154(b) by 0 days.

(21) Appl. No.: 18/660,184

(22) Filed: May 9, 2024

(51) Int. Cl.
*A61B 17/64* (2006.01)
*A61B 17/66* (2006.01)

(52) U.S. Cl.
CPC ...... *A61B 17/6475* (2013.01); *A61B 17/6416* (2013.01); *A61B 17/66* (2013.01)

(58) Field of Classification Search
CPC .................................................. A61B 17/6416
See application file for complete search history.

(56) References Cited

U.S. PATENT DOCUMENTS

| | | | |
|---|---|---|---|
| 2,485,169 A | 10/1949 | Roeschke | |
| 4,541,422 A | 9/1985 | de Zbikowski | |
| 4,620,533 A * | 11/1986 | Mears | A61B 17/645 606/54 |
| 4,895,141 A * | 1/1990 | Koeneman | A61B 17/66 606/57 |
| 5,356,411 A | 10/1994 | Spievack | |
| 5,358,504 A | 10/1994 | Paley et al. | |
| 6,022,348 A | 2/2000 | Spitzer | |
| 6,409,729 B1 | 6/2002 | Martinelli et al. | |
| 6,565,564 B2 | 5/2003 | Hoffman et al. | |
| 7,041,103 B2 | 5/2006 | Hoffman-Clair et al. | |
| 7,048,735 B2 | 5/2006 | Ferrante et al. | |
| 7,334,506 B2 | 2/2008 | Hui | |
| 7,699,848 B2 | 4/2010 | Hoffman et al. | |
| 7,722,609 B2 | 5/2010 | Bordeaux | |
| 7,931,650 B2 | 4/2011 | Winquist et al. | |
| 8,361,120 B2 | 1/2013 | Gabelberger et al. | |
| 8,403,928 B2 | 3/2013 | Bordeaux | |
| 8,734,446 B2 | 5/2014 | Miller | |
| 8,758,343 B2 | 6/2014 | Maughan et al. | |
| 9,539,029 B1 | 1/2017 | Muniz et al. | |
| 9,549,762 B2 | 1/2017 | Thomke et al. | |
| 9,848,912 B1 | 12/2017 | Endara et al. | |
| 10,478,224 B1 | 11/2019 | Endara et al. | |

(Continued)

*Primary Examiner* — David W Bates
(74) *Attorney, Agent, or Firm* — MALLOY & MALLOY PL

(57) ABSTRACT

A fixator rod coupler assembly designed to enable orthopedic practitioners to set, alter, and maintain the alignment of fractured or deformed bones with precision. The assembly incorporates a novel arrangement of a shaft, angular adjustments, arms, a spring and more, facilitating extensive range of motion, ensuring stability once positioned, and allowing for minuscule adjustments. Concerning the assembly itself, it can comprise a central shaft surrounded by top and bottom angular adjustments, each featuring arms with tooling channels and threaded rod receivers equipped with compression channels for secure rod engagement. Further, a tensioner assembly, working in concert with a strategically placed spring, allows for selective tensioning between fully tensioned, partially tensioned, and un-tensioned states, supporting granular adjustments necessary for precise bone alignment and assembly stability.

15 Claims, 9 Drawing Sheets

(56) References Cited

U.S. PATENT DOCUMENTS

| | | | |
|---|---|---|---|
| 2002/0037193 A1* | 3/2002 | Gibbons | H02G 3/30 403/344 |
| 2006/0229604 A1* | 10/2006 | Olsen | A61B 17/6425 606/54 |
| 2006/0287652 A1* | 12/2006 | Lessig | A61B 17/6458 606/54 |
| 2007/0038217 A1* | 2/2007 | Brown | A61B 17/6466 606/57 |
| 2007/0198012 A1* | 8/2007 | Thomke | F16B 7/0493 606/54 |
| 2009/0299368 A1 | 12/2009 | Bauer | |
| 2009/0306661 A1* | 12/2009 | Thomke | A61B 17/645 606/53 |
| 2009/0326532 A1* | 12/2009 | Schulze | A61B 17/6458 606/56 |
| 2010/0262143 A1 | 10/2010 | Bordeaux | |
| 2010/0298827 A1* | 11/2010 | Cremer | A61B 17/666 606/54 |
| 2011/0066151 A1 | 3/2011 | Murner et al. | |
| 2011/0087226 A1* | 4/2011 | Murner | A61B 17/6466 606/54 |
| 2012/0004659 A1* | 1/2012 | Miller | A61B 17/60 606/54 |
| 2012/0089142 A1 | 4/2012 | Mullaney et al. | |
| 2012/0150181 A1* | 6/2012 | Dorawa | A61B 17/6466 606/59 |
| 2012/0150182 A1* | 6/2012 | Dominik | A61B 17/60 606/59 |
| 2012/0209264 A1 | 8/2012 | Zandona et al. | |
| 2013/0165931 A1 | 6/2013 | Bordeaux | |
| 2014/0251091 A1 | 9/2014 | Hui | |
| 2016/0038185 A1* | 2/2016 | Disegi | A61B 17/6416 606/59 |
| 2019/0110815 A1* | 4/2019 | Perret | A61B 17/6466 |

\* cited by examiner

FIXATOR ROD COUPLER ASSEMBLY

BACKGROUND OF THE INVENTION

Field of the Invention

The present disclosure relates generally to medical hardware designed for the stabilization and healing of broken or deformed bones. More specifically, the present disclosure pertains to connectors, hinges, and/or joints used in conjunction with fixators, which generally comprise clamps, rods, and/or pins. As such, the present disclosure provides an assembly that assists with the diagnosis and treatment of bone displacements or abnormalities, enhancing the treatment's effectiveness.

DESCRIPTION OF THE RELATED ART

External fixators are pivotal in modern orthopedic medicine, particularly for managing complex fractures and correcting orthopedic deformities/breakages. These devices work by externally stabilizing deformed/fractured bones through a configuration of rods, pins, clamps, connectors, and joints that penetrate the skin and affix to the bone. The stability provided by the external fixator is crucial for the proper alignment and healing of bone segments.

Among the components of an external fixator, couplers, hinges, and/or joints play a fundamental role. These elements allow for the dynamic adjustment of the device, accommodating movements necessary for the correct anatomical realignment of bones. The couplers, hinges, and/or joints facilitate the rotational and angular positioning of the rods, pins, and (in some cases) clamps, which are crucial for maintaining the proper orientation of bone fragments during the healing/realignment process. This ability to adjust and fine-tune the device is essential, as it directly impacts the mechanical conditions at the fracture site, influencing both healing/realignment speed and quality.

Precision in the movement and adjustment of these components is paramount. The healing process of bones, particularly in cases of complex fractures or corrections of deformities, depends heavily on the exact mechanical environment provided by the fixator. Slight deviations from the optimal alignment can lead to improper healing, resulting in malunions or non-unions, which are scenarios where the bones heal incorrectly or fail to heal, respectively. The precision of movements allowed by the couplers, hinges, and/or joints in an external fixator can significantly affect the outcome of the healing process.

However, current technologies in external fixators often fall short in providing the required precision for optimal bone healing. Many existing devices have limitations in their range of motion, the granularity of their adjustments, or the stability of their hold once positioned. These limitations can lead to difficulties in achieving and maintaining the precise alignment needed for effective bone healing. The inability to finely adjust the position or to secure that position against movement under normal treatment can compromise the healing process.

As such, there is a pressing need in the field of orthopedic medicine for advancements in the design and functionality of external fixators. Specifically, there is a demand for an assembly that allows for more precise, controlled movements and adjustments using the device's couplers, hinges, and/or joints. Such improvements would provide orthopedic practitioners with the ability to more accurately set and maintain the position of fractured/deformed bones, enhancing the healing outcomes and reducing the likelihood of complications.

While external fixators are indispensable tools in the treatment of fractures and orthopedic corrections, the current limitations in their design particularly in the mechanisms that allow for precise adjustments underscore a significant gap in medical technology. There exists a crucial need for innovative solutions that address these shortcomings, enhancing the precision and effectiveness of external fixation and thereby improving patient outcomes in orthopedic care.

SUMMARY OF THE INVENTION

The present disclosure provides for an innovative assembly that allows for precise adjustments of a fixator's couplers, hinges, and/or joints so as to allow orthopedic practitioners with the ability to more accurately set and maintain the position of fractured/deformed bones. Further, the instant assembly, described as a fixator rod coupler assembly, described herein allows for a device that has a large range of motion and maintains stability once positioned, yet still allows for granular levels of adjustments.

As such, the present disclosure provides for a fixator rod coupler assembly comprising a central shaft (which may be threaded), a bottom angular adjustment that is centered about the central shaft, a top angular adjustment that is centered about the central shaft, a spring centered about the shaft that is configured and dimensioned to compress between the bottom angular adjustment and the top angular adjustment, and a tensioner assembly configured and dimensioned to conjoin a face of the bottom angular adjustment and a face of the top angular adjustment, and compress the spring between the bottom angular adjustment and the top angular adjustment.

Regarding the bottom angular adjustment, it may comprise a bottom arm that extends outwardly from the bottom angular adjustment. The bottom arm may also comprise at least one tooling channel (such as a channel to allow a wrench or socket to grab hold of), and at least one threaded rod receiver configured and dimensioned to receive at least one nut comprising a tapered interior with thread therein. The at least one threaded rod receiver can comprise compression channels configured and dimensioned to compress a rod when a rod is inserted into the at least one threaded rod receiver and when at least one nut comprising a tapered interior with thread therein is fastened to the at least one threaded rod receiver.

Much of the same is true for the top angular adjustment, as it may comprise a top arm that extends outwardly from the top angular adjustment. The top arm may also comprise at least one tooling channel (such as a channel to allow a wrench or socket to grab hold of), and at least one threaded rod receiver configured and dimensioned to receive at least one nut comprising a tapered interior with thread therein. The at least one threaded rod receiver can comprise compression channels configured and dimensioned to compress a rod when a rod is inserted into the at least one threaded rod receiver and when at least one nut comprising a tapered interior with thread therein is fastened to the at least one threaded rod receiver.

Both the bottom angular adjustment and the top angular adjustment may also comprise faces. However, the bottom angular adjustment may comprise at least one groove configured and dimensioned to receive at least one ridge of the face of the top angular adjustment. These groove and ridge elements at least partially allow for the tensioner assembly to be selectably positioned between a fully tensioned position, partially tensioned position, and an un-tensioned position. Regarding the fully tensioned position, this position allows the tensioner assembly to conjoin the face of the bottom angular adjustment and the face of said top angular adjustment wherein the at least one ridge of the face of the top angular adjustment is inserted into the at least one groove of the face of the bottom angular adjustment. This conjoining of faces and insertion of the ridge into the groove thus bars the bottom angular adjustment from rotating about the central shaft and bars the top angular adjustment from rotating about the central shaft.

Concerning the partially tensioned position, this position allows the tensioner assembly to conjoin the face of the bottom angular adjustment and the face of the top angular adjustment wherein the at least one ridge of the face of the top angular adjustment can rotate out of the at least one groove of the face of the bottom angular adjustment and into another at least one groove of the face of the bottom angular adjustment, allowing the top angular adjustment and bottom angular adjustment to rotate about the central shaft. Notably, this position/orientation allows for the assembly to have a granular adjustment, allowing the top angular adjustment and bottom angular adjustment to only rotate about the central shaft a distance between grooves.

Further, the un-tensioned position allows for the bottom angular adjustment to rotate freely about the central shaft and the top angular adjustment to do the same.

Concerning the spring center about the shaft, the spring may be additionally configured and dimensioned to apply an anti-tensioning force (to the tensioner assembly), allowing for the tensioner assembly to be selectably positioned between the fully tensioned position and the partially tensioned position. The top angular adjustment may also comprise a channel configured and dimensioned to receive the spring centered about the shaft wherein a rim may top the channel, configured and dimensioned to allow at least one coil of the spring centered about the shaft to exert an anti-tensioning force upon the rim. In addition, the bottom angular adjustment can comprise a channel configured and dimensioned to receive at least one coil of the spring centered about the shaft (a coil distinct as that which might exert an anti-tensioning force upon the rim).

Lastly, concerning the tensioner assembly, while not required, the tensioner assembly may comprise a washer and nut wherein the nut may comprise friction slots about an exterior circumference of the nut. Further, the top angular adjustment may comprise a notch configured and dimensioned to nestle the washer beneath the nut.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
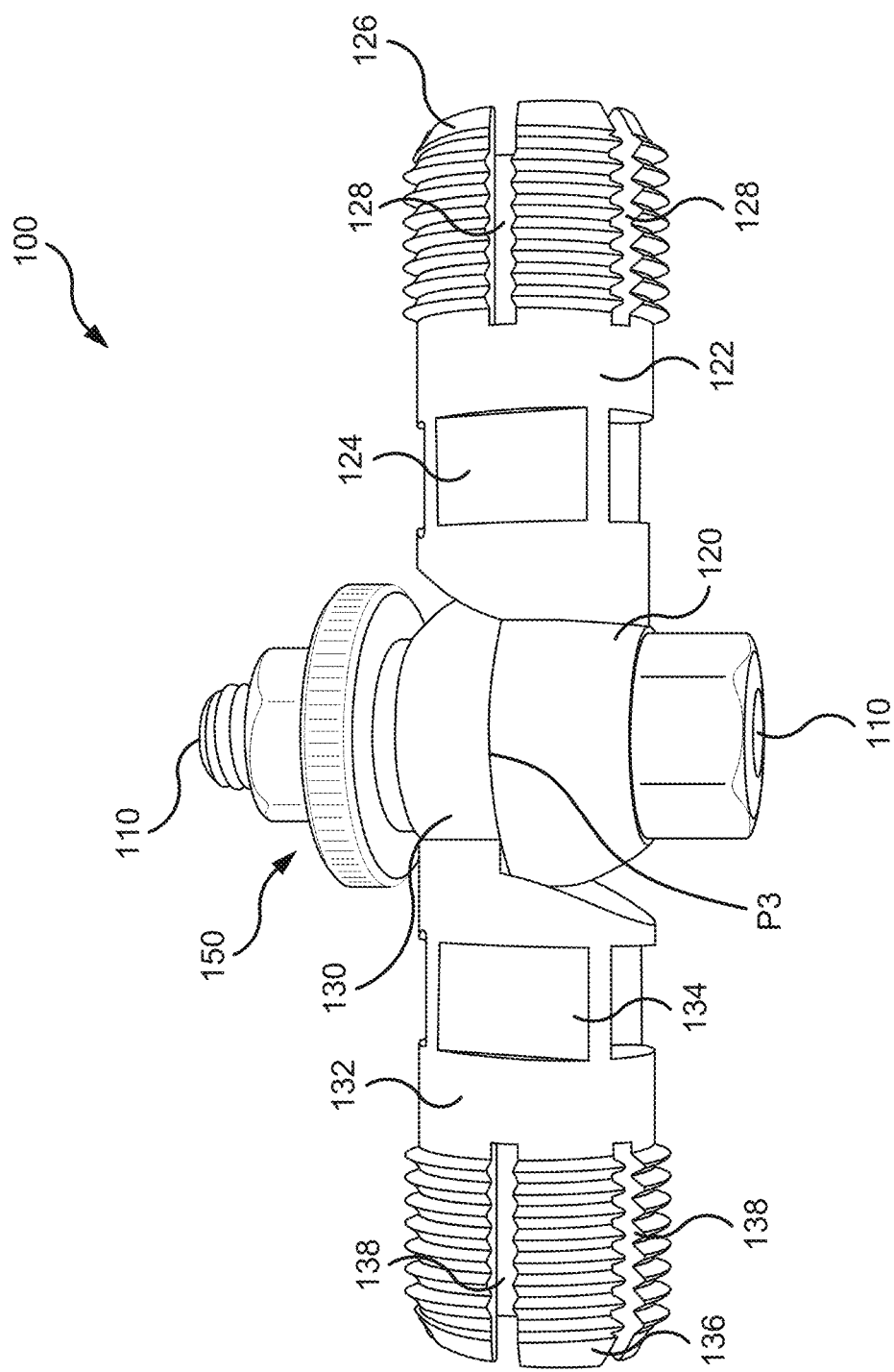
FIG. 1 is a side perspective view of a fixator rod coupler assembly in a fully tensioned position.

With reference now to FIG. 1, FIG. 1 depicts a side perspective view of a fixator rod coupler assembly 100. In FIG. 1, the fixator rod coupler assembly is positioned in a fully tensioned position P3. A number of elements are also present on FIG. 1, namely, a central shaft 110, a bottom angular adjustment 120 (that may engulf, slide over, or otherwise be centered about the central shaft 110 when the central shaft 110 passes through a passage of the bottom angular adjustment 120), a bottom arm 122, a tooling channel 124 of the bottom arm, a threaded rod receiver 126 of the bottom arm wherein the threaded rod receiver 126 further comprises at least one compression channel 128, a top angular adjustment 130 (that may engulf, slide over, or otherwise be centered about the central shaft 110 when the central shaft passes through a passage of the top angular adjustment 130), a top arm 132, a tooling channel 134 of the top arm, a threaded rod receiver 136 of the top arm wherein the threaded rod receiver 136 further comprises at least one compression channel 138, and a tensioner assembly 150. These elements, among others will be described in subsequent detail and better understood after reference is had to other figures and descriptions thereof, below.

Figure 2:
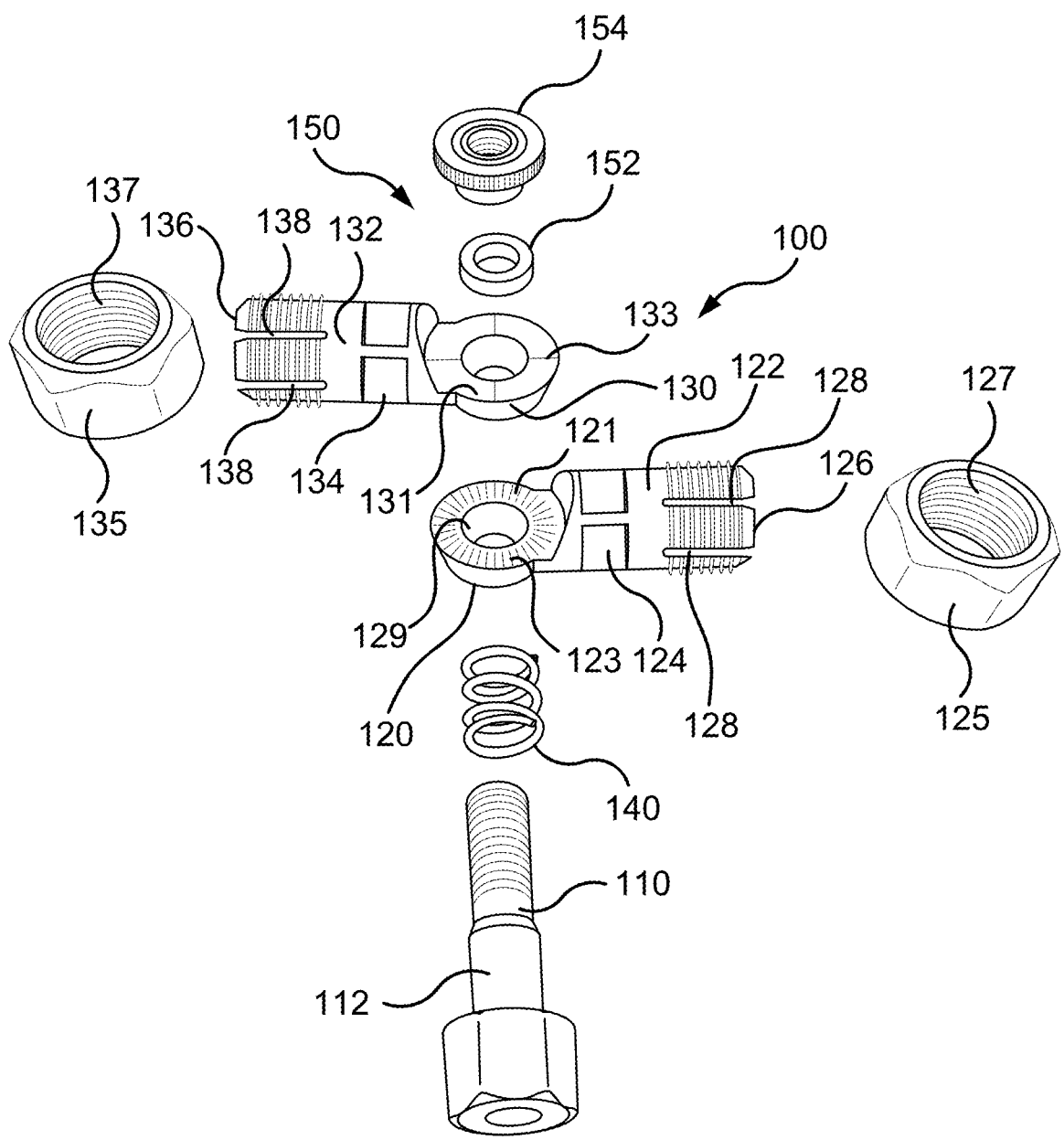
FIG. 2 is an exploded perspective view of a fixator rod coupler assembly.

As such, with reference now to FIG. 2, FIG. 2 depicts an exploded perspective view of a fixator rod coupler assembly. While many elements as described above and as present in FIG. 1 are also present in FIG. 2, new elements (some of which are parts of elements as described above) can now be referenced. Specifically, The central shaft 110 can be seen more fully, revealing a spring seat 112 (wherein the spring 140 may sit on the spring seat 112), a face of the bottom angular adjustment 121 wherein the face of the bottom angular adjustment 121 comprises at least one groove member 123, at least one nut 125 comprising a tapered interior with thread therein 127, a channel 129 of the bottom angular adjustment, a face of the top angular adjustment 131 wherein the face of the top angular adjustment 131 comprises at least one ridge member 133, at least one nut 135 comprising a tapered interior with thread therein 137, and the various elements of the tensioner assembly (namely, the washer 152 and nut 154). Again, these elements, among others will be described in subsequent detail and better understood after reference is had to other figures and descriptions thereof, below.

Figure 3:
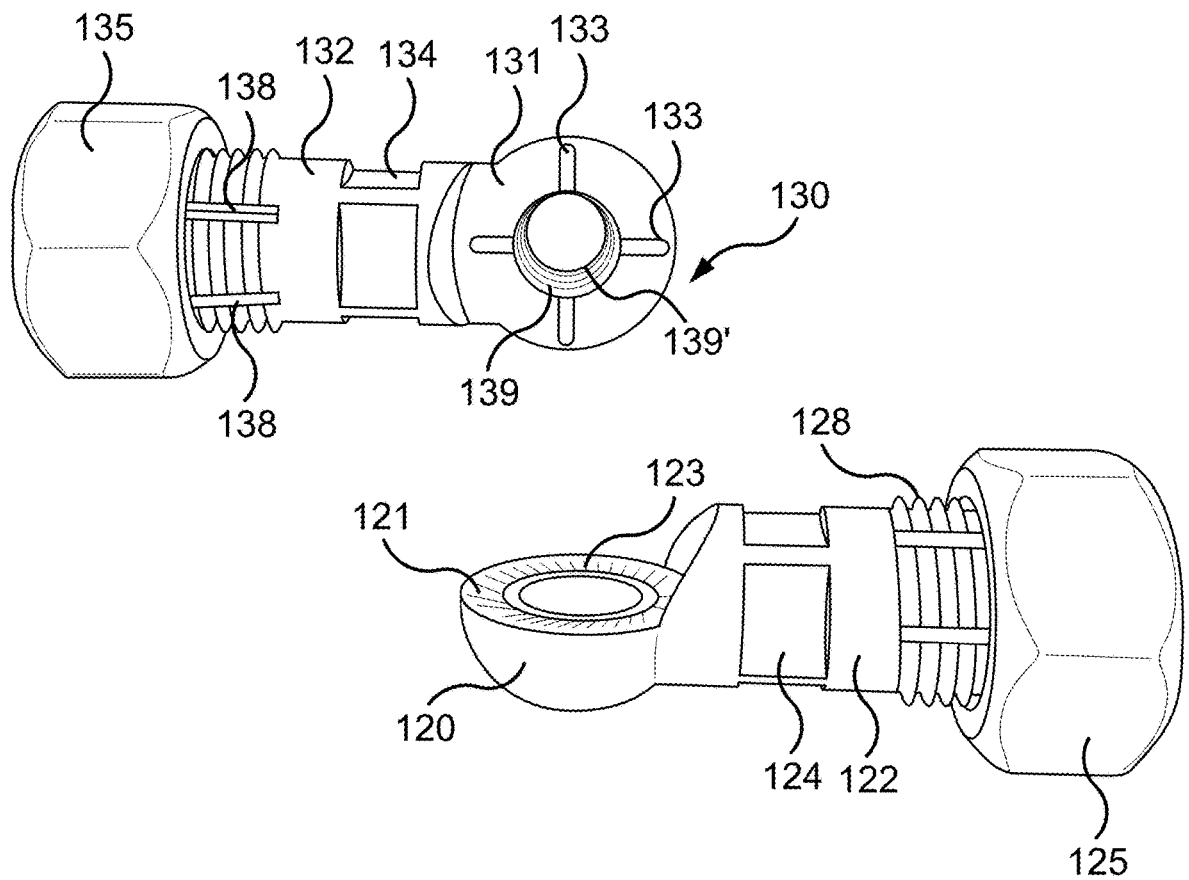
FIG. 3 is a perspective view of portions of a fixator rod coupler assembly.

With reference now to FIG. 3, FIG. 3 generally depicts the bottom angular adjustment 120 (with its arm 122 connected thereto) and the top angular adjustment 130 (with its arm 132) connected thereto. In addition, FIG. 3 additionally depicts a channel 139 of the top angular adjustment 130 and a rim 139' of the top angular adjustment 130. As such, FIG.

3 can serve as a reference for depicting finer details of a fixator rod coupler assembly's 100 bottom angular adjustment 120 (with its arm 122 connected thereto and features of these elements) and the top angular adjustment 130 (with its arm 132 connected thereto and features of these elements). As may be noted from the instant Figure, the bottom arm's 122 threaded rod receiver 126 has a nut 125 (at least partially) screwed onto it, and the same is true for the top arms' 132 threaded rod receiver 136, which also has a nut 135 screwed onto it.

Regarding these features/elements, each the bottom arm's 122 threaded rod receiver 126 and the top arms' 132 threaded rod receiver 136 were described as having at least one compression channel (128/138) per the above and as are partially visible in FIG. 3. Moreover, the nuts (125/135) were described as comprising tapered interiors with thread therein (127/137). For clarity, the term tapered may be interpreted as conical, the larger surface area of the conical shape existing at one end of the nut 125/135 and the smaller surface area of the conical shape existing at another end of the nut 125/135. However, with brief reference to FIG. 2, it may be noted that the nuts' 125/135 interior's (127/137) are visible (and threads are located thereon that correspond to the bottom arm's 122 threaded rod receiver 126 and top arm's 132 threaded rod receiver 136). As such, the term tapered may be considered to mean that the interior's 127/137 of the nuts 125/135 begin at a first circumference (the visible circumference of the nuts 125/135 in FIG. 2), and then end at a second circumference (as is not fully visible in FIG. 2) wherein the first circumference is larger than the second circumference.

Now that the above has been described, when a nut 125/135 is screwed or otherwise placed on the threaded rod receivers 126/136, a nut 125/135 begins to be screwed/placed onto the threaded rod receivers 126/136 at the end of the nut 125/135 with the beginning of a taper (the portion of the nut 125/135 described as having a larger surface area should the term tapered be interpreted as conical—or—the first circumference as described immediately above). As such, as the nut 125/135 continues to be screwed into or otherwise placed onto the threaded rod receivers 126/136, the tapering of the interior of the nuts 127/137 begin to exert compressive forces upon the threaded rod receivers 126/136 or otherwise increasingly exert compressive forces upon the threaded rod receivers 126/136. As the threaded rod receivers 126/136 comprise at least one compression channel 128/138, the compression channels 128/138 begin to allow the entire structure of the threaded rod receivers 126/136 to compress or otherwise deform towards a central point or plane of the respective arm (122/132) the threaded rod receiver 126/136 is located on. As the nut 125/135 continues to be screwed into and/or placed onto the threaded rod receivers 126/136, the force required to do so may increase. As such, the arms 122/134 comprise at least one tooling channel 124/134 so as to allow a tool to stabilize the arms 122/134 as a nut 125/135 is being screwed into or otherwise placed on the threaded rod receiver 126/136 (perhaps a user additionally using a tool to screw or otherwise place the nut 125/135 into/onto the threaded rod receiver 126/136)

Figure 8:
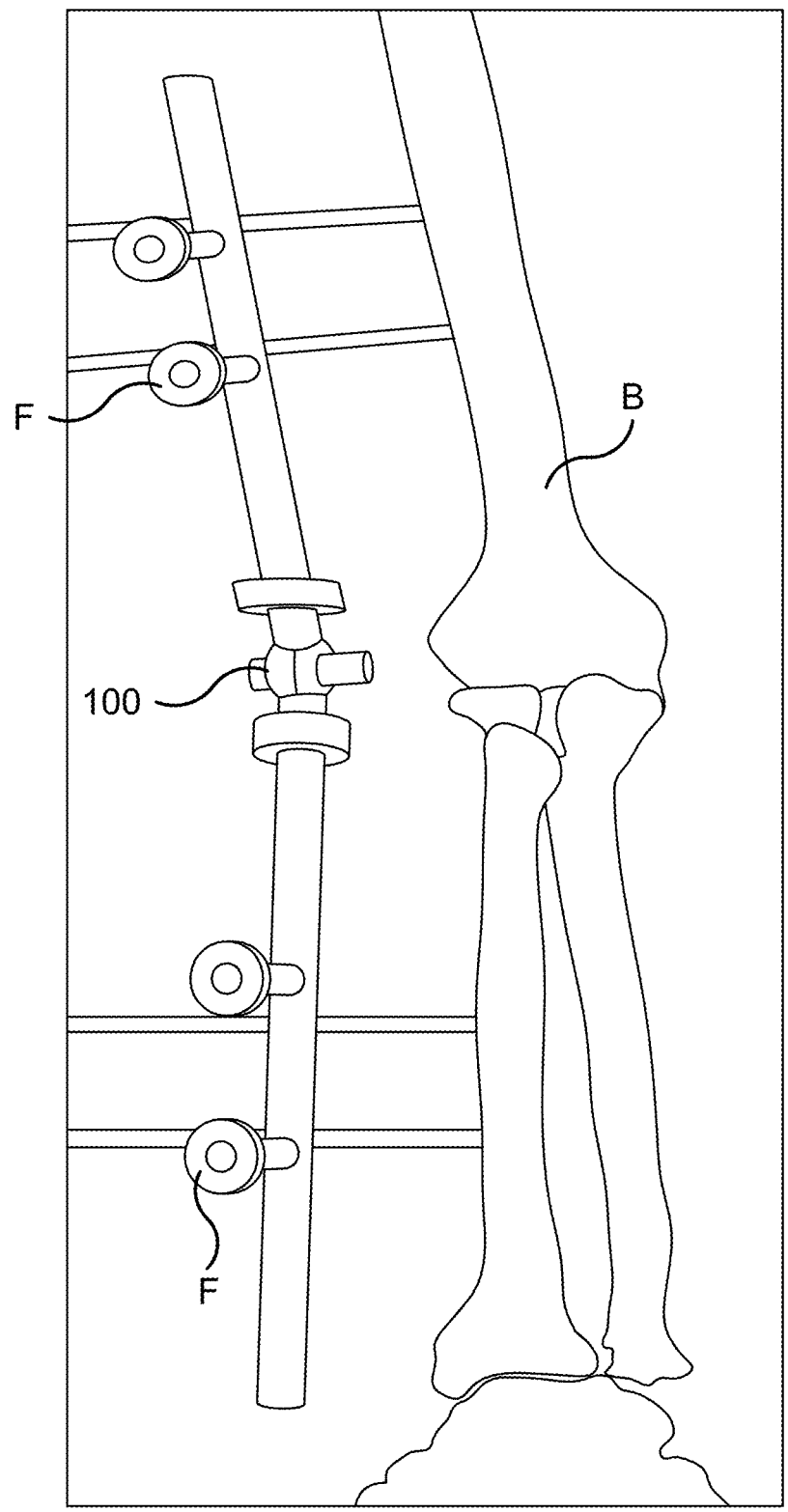
FIG. 8 is a view of how a fixator rod coupler assembly may be used.
Figure 9:
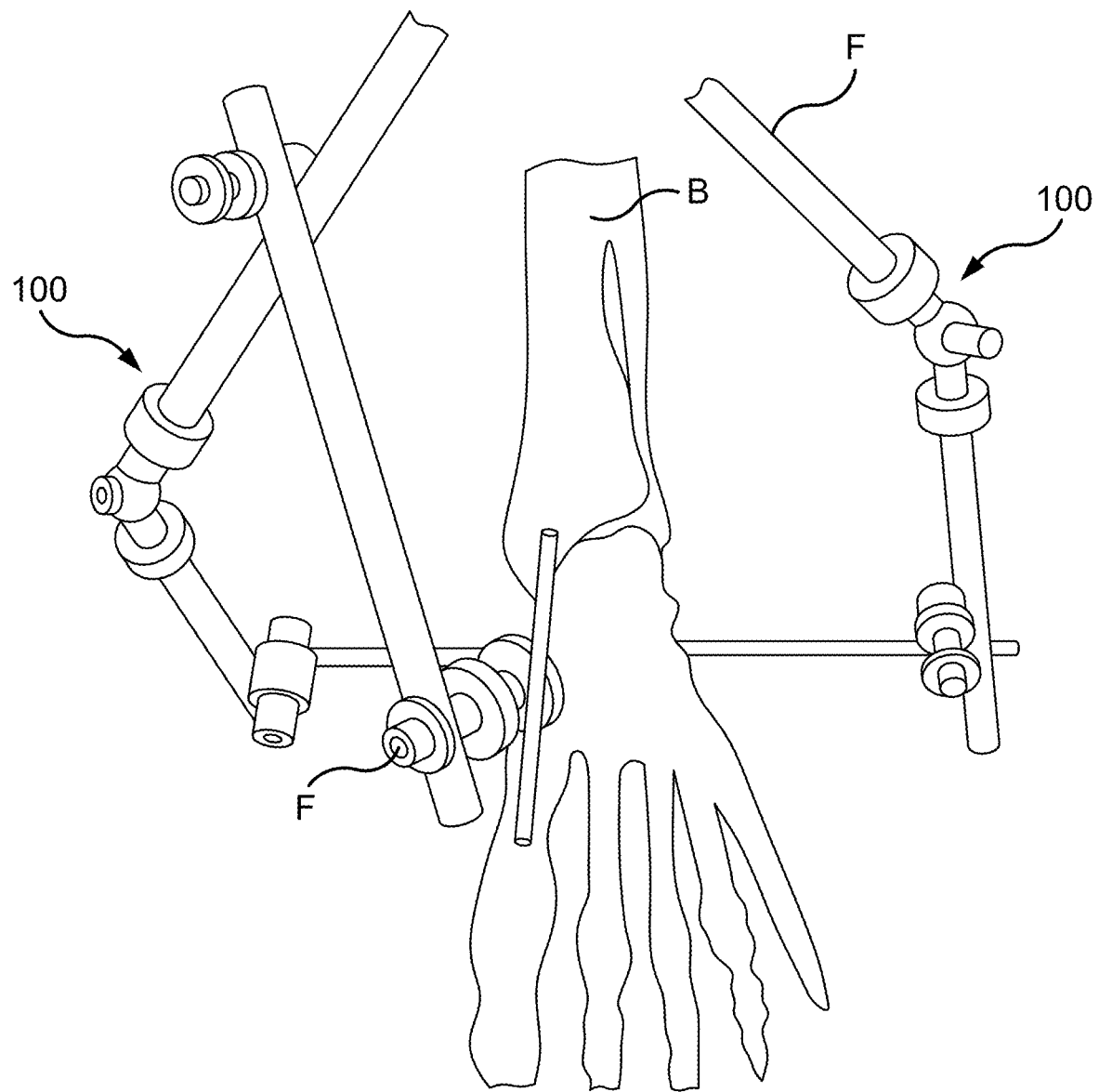
FIG. 9 is another view of how multiple fixator rod coupler assemblies may be used.

As such, before a nut 125/135 is screwed or otherwise placed on to the threaded rod receiver 126/136, the threaded rod receivers 126/136 may receive a rod. In such an instance, the rod may freely slide in or out of the threaded rod receivers 126/136 (albeit tolerances may still be tight so as to allow the rod to contact the circumference of the threaded rod receivers 126/136). That said, after a rod is slid or otherwise inserted into a threaded rod receiver 126/136, a nut 125/135 may be slid over the rod and begin to be screwed into or otherwise placed onto the threaded rod receivers 126/136. As such, as the nut 125/135 continues to be screwed into or otherwise placed onto the threaded rod receivers 126/136, the tapering of the interior of the nuts 127/137 begin to exert compressive forces upon the threaded rod receivers 126/136 or otherwise increasingly exert compressive forces upon the threaded rod receivers 126/136. As the threaded rod receivers 126/136 comprise at least one compression channel 128/138, the compression channels 128/138 begin to allow the entire structure of the threaded rod receivers 126/136 to compress or otherwise deform towards a central point or plane of the respective arm (122/132) the threaded rod receiver 126/136 is located on, thereby compressing onto and clamping the rod into place. In such an instance, as the nut 125/135 continues to be screwed into or otherwise placed onto the threaded rod receivers 126/136, the compressive force upon the rod increases, furthering the force keeping the rod in place. For illustration, brief reference may be had to FIG. 8, displaying an example of a fixator rod coupler assembly 100 being used as part of a fixator F. In FIG. 8, rods of the fixator F can be seen extending vertically away from the fixator rod coupler assembly 100. For further illustration, brief reference can be had to FIG. 9, displaying an example of two fixator rod coupler assemblies 100 being used as part of a fixator F. In FIG. 9, rods of the fixator F are once again seen extending vertically away from the fixator rod coupler assemblies 100 (albeit at different angles, as a fixator rod coupler assembly 100 may allow for the angling of rods extending away from a fixator rod coupler assembly 100 as will be described in more detail).

Some of the aforementioned elements will be described in subsequent detail and better understood after reference is had to other figures and descriptions thereof, below.

Figure 4:
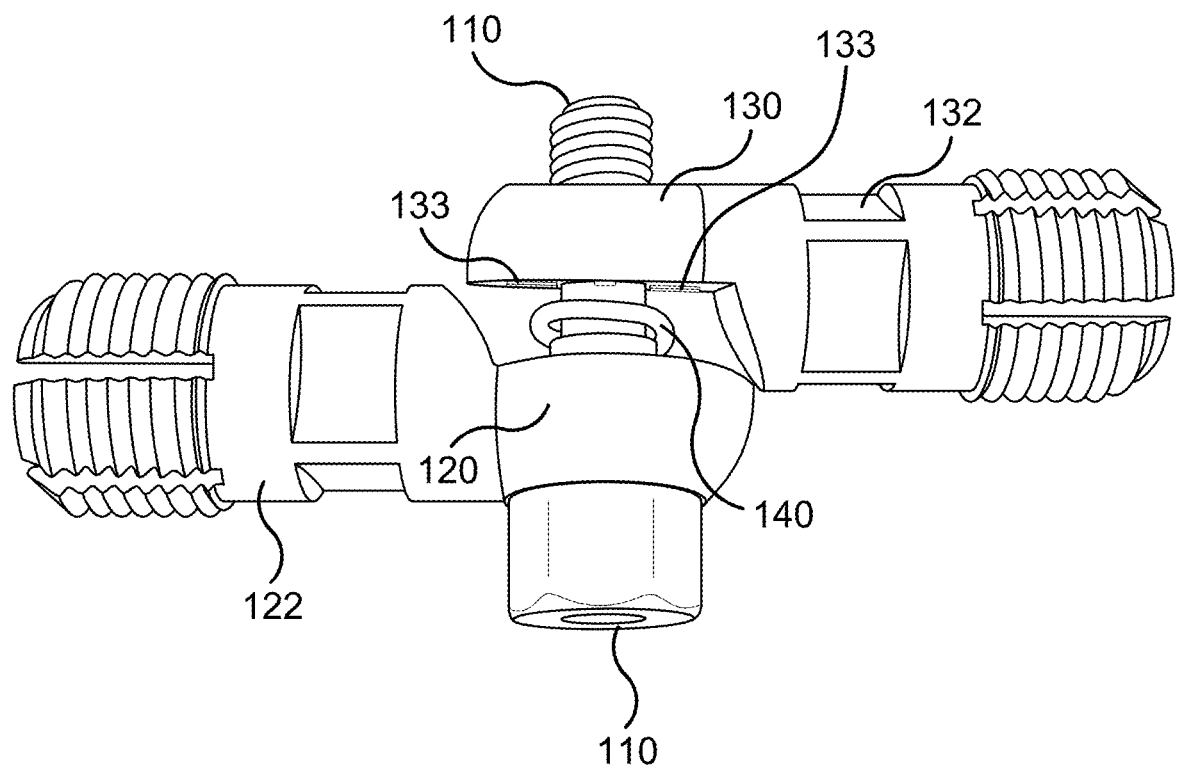
FIG. 4 is a side perspective view of portions of a partially assembled fixator rod coupler assembly.

With reference now to FIG. 4, FIG. 4 is a side perspective view a partially assembled fixator rod coupler assembly 100. Notably, FIG. 4 does not depict the nuts 125/135 as were previously described, nor does FIG. 4 depict the tensioner assembly 150 (as was also previously described). However, the central shaft 110 can be seen running through the bottom angular adjustment 120 (wherein the spring 140 is centralized about the central shaft 110 and within the channel 129 of the bottom angular adjustment. Atop the bottom angular adjustment 120 is the top angular adjustment 130, also with the central shaft 110 running through the top angular adjustment (however, and notably, a top coil of the spring 140 is not yet in contact with the top angular adjustment 130, nor is the spring 140 received by the top angular adjustment's 130 channel 139.

That said, and as can be inferred with reference to FIG. 4, a face of the bottom angular adjustment 121 is oriented towards a face of the top angular adjustment 131. As is partially visible in FIG. 4, the at least one ridge 133 of the face of the top angular adjustment 131 can be seen as oriented towards the face of the bottom angular adjustment 121. Moreover, both the face of the bottom angular adjustment 121 and the face of the top angular adjustment 131 (not considering the at least one ridge 133 or groove 123) appear as having the same or nearly identical surface areas. As such, should the top angular adjustment 130 be in contact with the bottom angular adjustment 120, each respective elements' faces 121/131 could fully contact each other (again, not considering the at least one ridge 133 or groove 123).

Once again, some of the aforementioned elements will be described in subsequent detail and better understood after reference is had to other figures and descriptions thereof, below.

Figure 5:
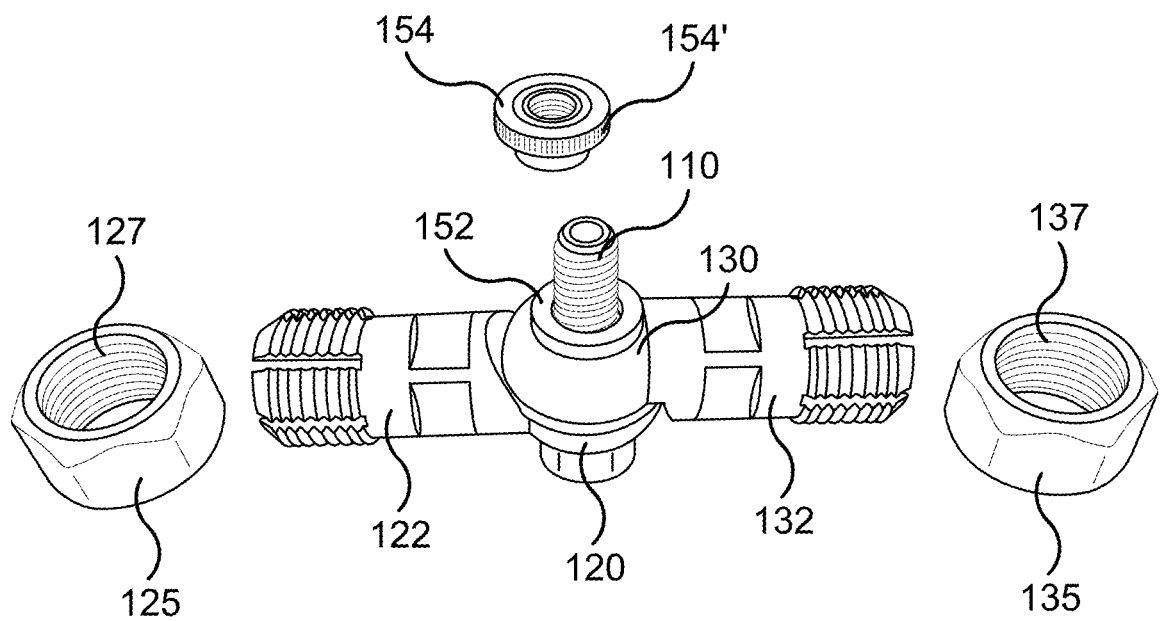
FIG. 5 is a perspective view of portions of a partially assembled fixator rod coupler assembly.

With reference now to FIG. 5, FIG. 5 is a highly similar depiction of the partially assembled fixator rod coupler assembly 100 of FIG. 4. That said, FIG. 5 also depicts a partially assembled fixator rod coupler assembly 100. However, in this depiction, (beyond how the nuts 125/135 and interiors 127/137 thereof can be seen), the tensioner assembly 150 (made up of at least the washer 152 and nut 154) can also be seen. In this instance, the washer 152 is seen as resting in a channel carved out of the top angular adjustment 130 specifically for the washer 152. Further, the nut 154 can be seen, as well as the friction slots 154' that are about an exterior circumference of the nut 154. Also, it can be noted that the nut 154 is threaded, wherein the threaded aperture is dimensioned so as to screw into/onto the central shaft 110, which also may be threaded. While not depicted, the spring 140 may be preventing the face of the top angular adjustment 131 from coming in contact with the face of the bottom angular adjustment 121. Again, some of the aforementioned elements will be described in subsequent detail and better understood after reference is had to other figures and descriptions thereof, below.

Figure 6:
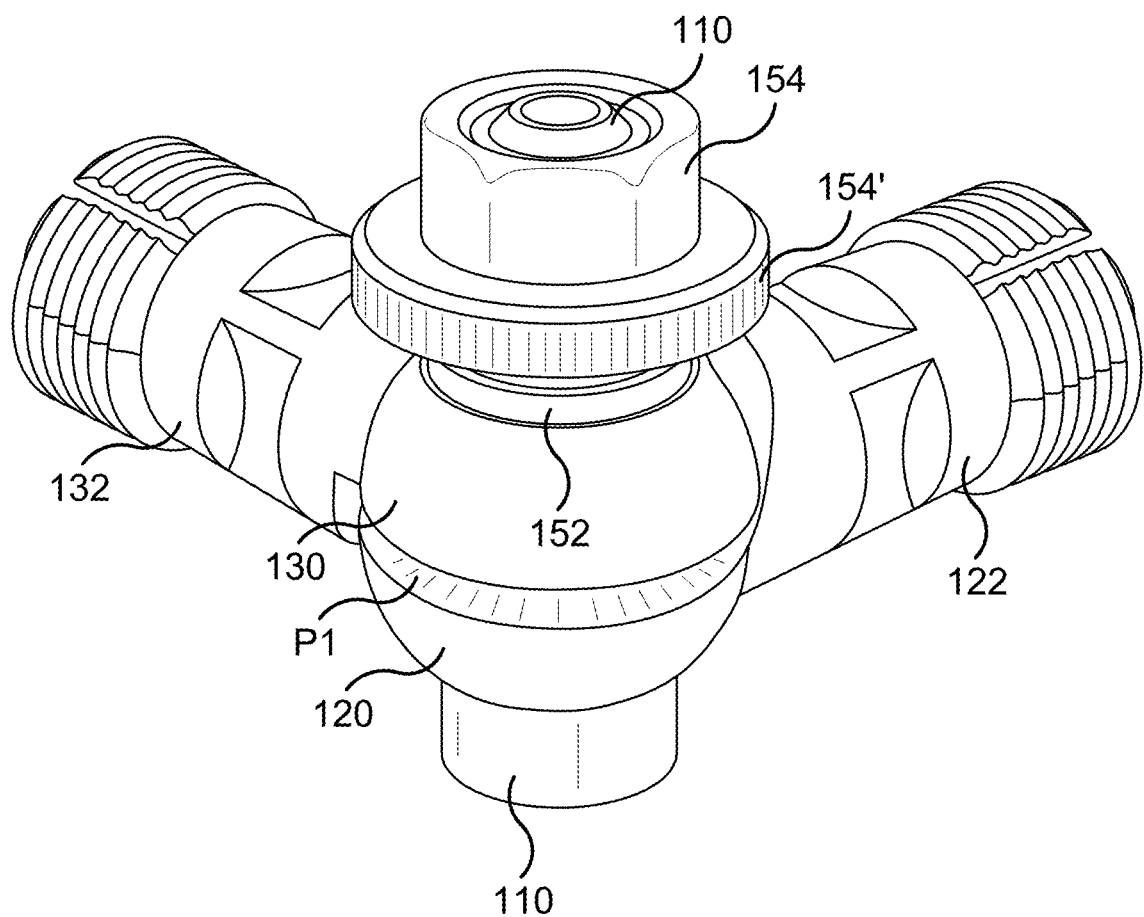
FIG. 6 is a perspective view of a fixator rod coupler assembly in an un-tensioned position.

With reference now to FIG. 6, FIG. 6 depicts a perspective view of the assembly 100 (without the nuts 125/135) thereon. More specifically, FIG. 6 depicts a view of the assembly 100 in an un-tensioned position P1. Further, as may be clearer, it can be noted that the arms 122/132 of the instant assembly 100 may be able to rotate about the central shaft 100 (although the arms 122/132 are limited to rotating at angles beyond each other, as should be apparent with brief refence to FIG. 1). In addition, FIG. 6 more clearly depicts how the washer 152 can rest a channel carved out of the top angular adjustment 130 specifically for the washer 152. This channel and washer can provide a flat surface for the nut to apply a force to, so as to apply the force in equal distribution to the top angular adjustment 130. Also, FIG. 6 depicts how the tensioner assembly's nut 154 may be screwed into/onto the central shaft. As such, as should be inferable, the further the tensioner assembly 150 is moved down the central shaft 110, more of a force applies to the top angular adjustment 130. In turn, the top of the angular adjustment 130 is pressed or otherwise forced down on the central shaft 110. In addition, the further the tensioner assembly 150 is moved down the central shaft 110, the closer the face of the top angular adjustment 131 gets to the face of the bottom angular adjustment 121. As such, with respect to FIG. 6, a distance can be seen between the top angular adjustment 130 and the bottom angular adjustment 120. It can also be seen that the tensioner assembly 150 (made up of the washer 152 and nut 154) is not screwed down on the central shaft 110 (at least in comparison to FIG. 1). This positioning may be known as an un-tensioned position P1. This positioning (P1) indicates that the tensioner assembly 150 is not applying a force down onto the top angular adjustment 130 and as such, the face of the top angular adjustment 131 is not in contact/conjoined with the bottom angular adjustment 120/face thereof 121. Further, this positioning (P1) allows the arms 122/132 to rotate freely about the central shaft 110.

With reference back now to FIG. 1, FIG. 1 shows a side perspective view of a fixator rod coupler assembly 100 in a fully tensioned position P3. With reference back to FIG. 6, it can be noted that the tensioner assembly 150 has moved further down or along the central shaft 110. In turn, the gap between the top angular adjustment 130 and bottom angular adjustment 120 has become nearly undetectable. As such, the faces of the angular adjustments 121/131 are thus conjoined and at least one ridge 131 is placed, inserted, or otherwise locked between at least one groove 123. Indeed, the tensioner assembly 150 is applying a force of a magnitude to conjoin the faces of the angular adjustments 121/131 and retain at least one ridge 131 in one groove 123. As such, even if a user or other object were to apply a force to one or both of the arms 122/132 (or any portions of the arms/elements connected thereto) that would otherwise cause at least one of the arms 122/132 to rotate about the central shaft 110, the arms 122/132 would be unable to While not depicted, the spring 140 is compressed between the top and bottom angular adjustments 120/130.

Figure 7:
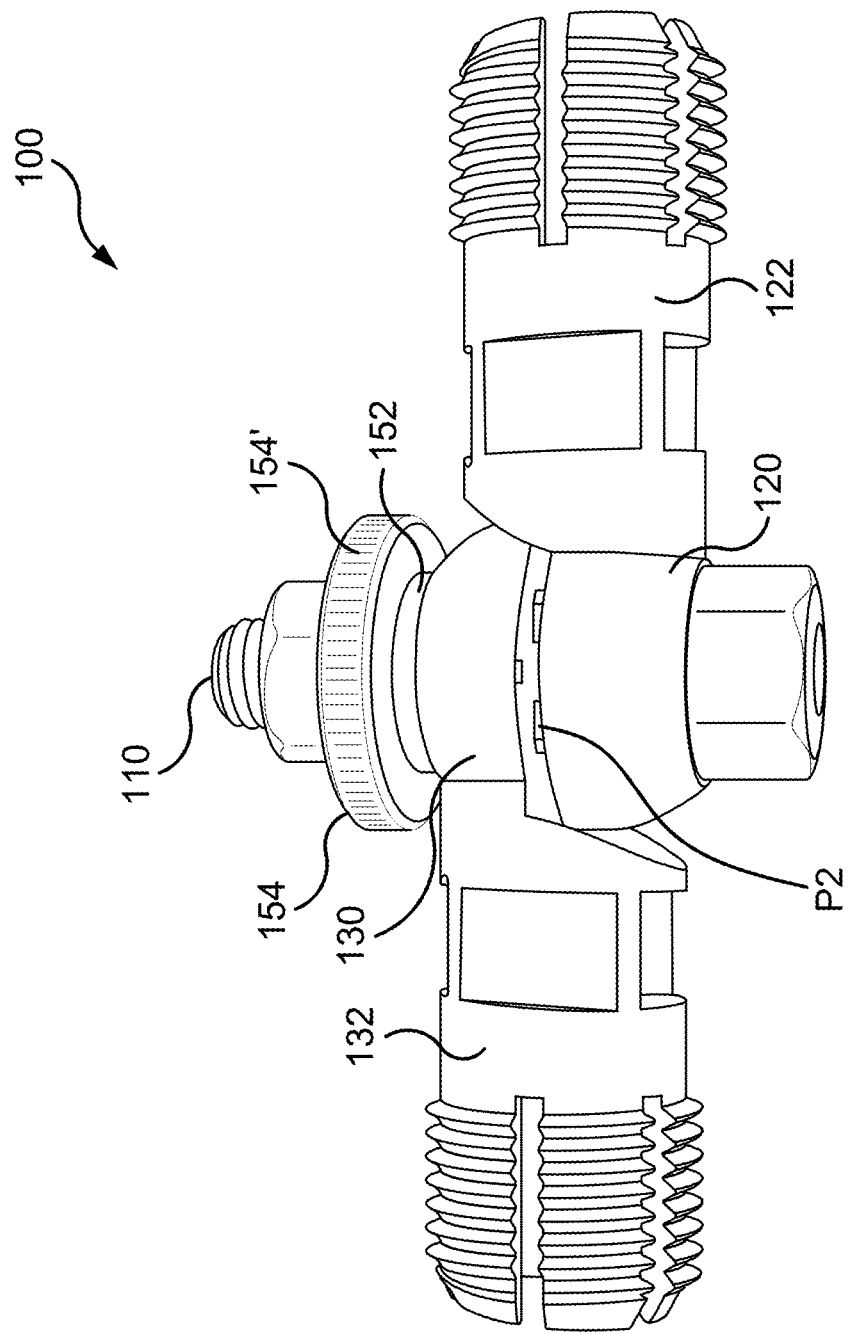
FIG. 7 is a perspective side view of a fixator rod coupler assembly in a partially tensioned position.

With reference now to FIG. 7, FIG. 7 shows a side perspective view of a fixator rod coupler assembly 100 in a partially tensioned P2 position. With reference to FIG. 1, it can be noted that the tensioner assembly 150 has moved further up the central shaft 110. However, with reference to FIG. 6, it can be noted that the tensioner assembly 150 has moved further down the central shaft or closer to the top over the angular adjustment 130. In turn, the gap between the top angular adjustment 130 and bottom angular adjustment 120 has become miniscule. Although not depicted, the faces of the angular adjustments 121/131 are thus conjoined, albeit slightly. However, the ridges 133 of the face of the top angular adjustment 131 are at an orientation where at least one ridge 133 may be slid over a corresponding groove member 123. This orientation is further facilitated by the spring 140 (as was compressed in the fully tensioned position P1) wherein the spring 140 applies an anti-tensioning force pre-calculated to allow the faces of the angular adjustments 121/131 to remain conjoined/in contact yet allow for at least one ridge member 133 to traverse from one groove 123 to another. This anti-tensioning force produced by the spring 140 would otherwise break the contact of the angular adjustments' faces 121/131. However, the spring 140 is applying just enough force so as to allow a ridge 133 to move from being placed, inserted, or otherwise locked between at least one groove 123 to another at least one groove 123 located immediately next to or as the next step in a series of grooves 123. As such, and in effect, by adjusting the tensioner assembly 150 so as to place the instant assembly 100 in a partially tensioned position P2, the fixator rod coupler assembly 100 may now have at least one of its arms 122/132 slightly rotated (the length of moving at least one groove 133 from one ridge 123 to another ridge 123).

With brief reference to FIG. 8, the figure displays an example of a fixator rod coupler assembly 100 being used as part of a fixator F for an ulna bone B fracture and radius bone B dislocation. In FIG. 8, rods of the fixator F can be seen extending vertically away from the fixator rod coupler assembly 100.

With brief reference to FIG. 9, the figure displays an example of two fixator rod coupler assemblies 100 being used as part of a fixator F for a tibia bone B fracture. In FIG. 9, rods of the fixator F are once again seen extending vertically away from the fixator rod coupler assemblies 100 (albeit at different angles, as a fixator rod coupler assembly 100 may allow for the angling of rods extending away from a fixator rod coupler assembly 100).

The following provides for an example of one use for the instant assembly. In a clinic, a medical professional prepares to use a fixator rod coupler assembly 100 for a patient with a complex leg fracture. The assembly starts with aligning the central shaft 110 through a bottom angular adjustment 120, a spring 140, and a top angular adjustment 130. All elements 120, 130, and 140 are centered around the central shaft 110, ensuring they are positioned correctly for initial setup.

Before applying the device to a fixator F structure, carbon fiber rods are inserted into the threaded rod receivers 126 of the bottom arm 122 and receivers 136 of the top arm 132. These rods serve as a portion of the structural framework of the external fixator F, which will be adjusted to align with the patient's anatomical structure for optimal support and stabilization. Notably, the fixator F can include other innovative designs, such as a distraction clamp. However, FIG. 9 contains a black box, indicating where a distraction clamp may be placed, but not a distraction clamp itself.

With the rods in place, a professional attach nuts 125 and 135, which feature tapered interiors with threads 127 and 137. These nuts are designed to secure the carbon fiber rods within the receivers 126/136 by applying compressive force to the rods via the compression channels 128 and 138, thereby ensuring the rods remain fixed during treatment.

The tensioner assembly 150, consisting of a washer 152 and a nut 154 with friction slots 154', is then adjusted. This assembly is crucial for setting the initial tension through the spring 140, which sits on the spring seat 112 on the central shaft 110. Initially, the assembly is placed in a fully tensioned position P3, locking the bottom angular adjustment 120 and top angular adjustment 130 at specific, pre-calculated angles from each other (calculated for the treatment of the bone), preventing any movement of the rods. The rods affixed to the assembly 100 are then placed on a fixator F.

As the patient's treatment progresses, it becomes necessary to adjust the fixator F for changes in bone alignment and healing. A medical professional adjusts the tensioner assembly 150 to allow for the assembly 100 to move from a fully tensioned position P3 to apartially tensioned position P2. This adjustment reduces the compressive force exerted by the spring 140. The reduced force allows the spring 140 to exert a controlled anti-tensioning force, which maintains a sufficient contact between the faces of the top and bottom angular adjustments 131 and 121 but permits the ridge 133 of the top angular adjustment 130 to disengage from one groove 123 and move into an adjacent groove. As such, the spring 140 exerts a calculated anti-tensioning force sufficient to maintain alignment of the rods, yet permit slight controlled angular movement of such rods. With the application of this calculated force from the spring, the ridge member 133 of the top angular adjustment 130 can now traverse from one groove member 123 to another located immediately next to the one groove member 123 in the face of the bottom angular adjustment 121, allowing for subtle realignment of the rods.

This movement allows for the rotation of the arms 122 and 132 about the central shaft 110, enabling the medical professional to make granular adjustments to the external fixator's alignment, improving the healing process's efficacy and the patient's comfort.

Once the desired alignment is achieved, the medical professional may tighten the tensioner assembly 150 back to a fully tensioned position P3 if stability is paramount, or maintain a partially tensioned position P2 to allow for natural bone healing movements.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A fixator rod coupler assembly comprising:
   a central shaft;
   a bottom angular adjustment centered about said central shaft;
   a top angular adjustment centered about said central shaft;
   a spring centered about said central shaft, configured and dimensioned to compress between said bottom angular adjustment and said top angular adjustment; and
   a tensioner assembly configured and dimensioned to conjoin a face of said bottom angular adjustment and a face of said top angular adjustment, and compress said spring between said bottom angular adjustment and said top angular adjustment,
   said bottom angular adjustment further comprising a bottom arm including at least one tooling channel and at least one threaded rod receiver configured and dimensioned to receive at least one nut comprising a tapered interior with thread therein,
   said at least one threaded rod receiver comprising compression channels configured and dimensioned to compress a rod when a rod is inserted into said at least one threaded rod receiver and said at least one nut comprising a tapered interior with thread therein is fastened to said at least one threaded rod receiver.

2. The fixator rod coupler assembly of claim 1 wherein said face of said bottom angular adjustment comprises at least one groove configured and dimensioned to receive at least one ridge of said face of said top angular adjustment.

3. The fixator rod coupler assembly of claim 2 wherein said tensioner assembly is configured and dimensioned to be selectably positioned between a fully tensioned position, partially tensioned position, and un-tensioned position.

4. The fixator rod coupler assembly of claim 3 wherein said fully tensioned position allows said tensioner assembly to conjoin said face of said bottom angular adjustment and said face of said top angular adjustment wherein said at least one ridge of said face of said top angular adjustment is inserted into said at least one groove of said face of said bottom angular adjustment, barring said bottom angular adjustment from rotating about said central shaft and barring said top angular adjustment from rotating about said central shaft.

5. The fixator rod coupler assembly of claim 3 wherein said partially tensioned position allows said tensioner assembly to conjoin said face of said bottom angular adjustment and said face of said top angular adjustment wherein said at least one ridge of said face of said top angular adjustment may rotate out of said at least one groove of said face of said bottom angular adjustment and into another at least one groove of said face of said bottom angular adjustment, allowing said top angular adjustment and said bottom angular adjustment to rotate about said central shaft.

6. The fixator rod coupler assembly of claim 3 wherein said un-tensioned position allows for said bottom angular adjustment to rotate about said central shaft and said top angular adjustment to rotate about said central shaft.

7. The fixator rod coupler assembly of claim 3 wherein said spring centered about said shaft is additionally configured and dimensioned to apply an anti-tensioning force, allowing for said tensioner assembly to be selectably positioned between said fully tensioned position and said partially tensioned position.

8. The fixator rod coupler assembly of claim 7 wherein said top angular adjustment comprises a channel configured and dimensioned to receive said spring centered about said shaft.

9. The fixator rod coupler assembly of claim 8 wherein said channel of said top angular adjustment comprises a rim configured and dimensioned to allow at least one coil of said spring centered about said shaft to exert an anti-tensioning force upon said rim.

10. The fixator rod coupler assembly of claim 1 wherein said bottom angular adjustment comprises a channel configured and dimensioned to receive at least one coil of said spring centered about said shaft.

11. The fixator rod coupler assembly of claim 1 wherein said central shaft is threaded.

12. The fixator rod coupler assembly of claim 1 wherein said tensioner assembly comprises a washer and nut.

13. The fixator rod coupler assembly of claim 12 wherein said nut comprises friction slots about an exterior circumference of said nut.

14. The fixator rod coupler assembly of claim 12 wherein said top angular adjustment comprises a notch configured and dimensioned to nestle said washer underneath said nut.

15. A fixator rod coupler assembly comprising:
- a central shaft;
- a bottom angular adjustment centered about said central shaft;
- a top angular adjustment centered about said central shaft;
- a spring centered about said central shaft, configured and dimensioned to compress between said bottom angular adjustment and said top angular adjustment; and
- a tensioner assembly configured and dimensioned to conjoin a face of said bottom angular adjustment and a face of said top angular adjustment, and compress said spring between said bottom angular adjustment and said top angular adjustment, said top angular adjustment comprising a top arm including at least one tooling channel and at least one threaded rod receiver configured and dimensioned to receive at least one nut comprising a tapered interior with thread therein, and said at least one threaded rod receiver comprising compression channels configured and dimensioned to compress a rod when a rod is inserted into said at least one threaded rod receiver and said at least one nut comprising a tapered interior with thread therein is fastened to said at least one threaded rod receiver.

* * * * *